United States Patent [19]
Jago et al.

[11] 3,961,928
[45] June 8, 1976

[54] DETECTION AND REDUCTION OF ROLL BOWING

[75] Inventors: John James Jago, Liverpool; Colin Billington, Burscough, both of England

[73] Assignee: Pilkington Brothers Limited, Merseyside, England

[22] Filed: June 16, 1975

[21] Appl. No.: 587,497

[30] Foreign Application Priority Data
June 21, 1974 United Kingdom............... 27717/74

[52] U.S. Cl........................................ 65/29; 65/62; 65/101; 65/161; 65/162; 65/355
[51] Int. Cl.² ........................................ C03B 13/16
[58] Field of Search ............... 65/29, 62, 101, 161, 65/162, 181, 355, 29 A

[56] References Cited
UNITED STATES PATENTS
1,801,689  4/1931  Pond ........................................ 65/29
2,184,908  12/1939  Do Huu Chan ........................ 65/355
2,991,531  7/1961  Gates ...................................... 65/161
3,186,811  6/1965  Lightfoot ................................ 65/29

Primary Examiner—Arthur O. Kellogg
Attorney, Agent, or Firm—Sughrue, Rothwell, Mion, Zinn & Macpeak

[57] ABSTRACT

Apparatus for detecting and reducing bowing of a rotating roll used with hot material comprises a proximity sensor mounted adjacent the surface of a roll or of a member attached thereto, and arranged to generate an electric signal which varies between maximum and minimum limit values during each revolution of the roll in dependence on any bowing of the roll, cooling means for selectively cooling parts of the roll and a bowing detection circuit arranged to receive the electric signal and provide an operating signal when the electric signal varies by more than a predetermined amount from one of the said limit values, and actuating means arranged to respond to the operating signal and operate the cooling means to cool a required part of the roll to reduce bowing.

17 Claims, 9 Drawing Figures

DETECTION AND REDUCTION OF ROLL BOWING

BACKGROUND OF THE INVENTION

The invention relates to rolls and in particular to apparatus and methods for detecting bowing of a roll used in contact with hot material and reducing any bowing detected. This is particularly useful in the manufacture of glass ribbon from a mass of molten glass where glass is caused to flow between co-operating rolls and it is necessary to prevent excessive bowing of the rolls in order to achieve glass ribbon of uniform thickness.

In the known rolled plate process for manufacturing a glass ribbon, glass is caused to flow from a mass of molten glass to a passage between co-operating rolls. The shape and separation of the rolls determine the surface shape and thickness of the glass ribbon being formed. As the rolls are in contact with hot glass, the rolls themselves will become heated and difficulties can arise from bowing of the rollers. To avoid these difficulties it is necessary to detect any bowing and then selectively adjust the temperature of parts of the roll surface to compensate for any bowing detected. It is an object of the present invention to provide improved apparatus for detecting any bowing and to apply corrective thermal treatment to selected areas on the roll surface. It is a further object to provide an improved electrical control arrangement which initiates thermal correction only when bowing of the roll exceeds a predetermined limit.

SUMMARY OF THE INVENTION

The present invention provides apparatus for detecting and reducing bowing of a rotating roll which is used in contact with hot material, which apparatus comprises a proximity sensor mounted in a fixed position adjacent the surface of a roll or of a member attached thereto, and arranged to generate an electric signal which varies between maximum and minimum limit values during each revolution of the roll in dependence on movement of the surface towards and away from the sensor as the roll rotates, heat transfer means arranged for selectively transferring heat to or from parts of the roll and control means responsive to said electric signal and arranged to control operation of the heat transfer means, said control means comprising a bowing detection circuit arranged to receive said electric signal and provide an operating signal for that period, if any, during any one revolution of the roll, that the said electric signal varies by more than a predetermined amount from one of the said limit values, and actuating means arranged to respond to the operating signal and operate the heat transfer means in predetermined synchronism with the occurrence of the operating signal so that heat is selectively transferred to or from a required part of the roll to reduce bowing of the roll.

Preferably the heat transfer means comprises cooling means and in this case the predetermined synchronism between the occurrence of the operating signal and the operation of the cooling means is such that cooling is applied to that part of the roll which is bowed outwardly from the axis of the roll. It will be appreciated that when the heat transfer means comprises heating means, the predetermined synchronism between the occurrence of the operating signal and the operation of the heating means is such that heat is applied to that part of the roll 180° around the roll from the part which is bowed outwardly from the axis of the roll.

The said electric signal varies in a wave form having one maximum and one minimum peak for each revolution of the roll. The limit values are the values of the maximum and minimum peaks and these may increase or decrease from one revolution to the next.

The heat transfer means may be located at an angular displacement around the roll from the said sensor and in this case the control means preferably includes a roll position detector arranged to provide a signal indicating change in the angular position of the roll, said actuating means being responsive to the output of the position detector so as to operate the heat transfer means when the roll has rotated through said angular displacement. Preferably the roll position detector includes a pulse generator arranged to produce index pulses as the roll rotates.

Preferably the bowing detection circuit is arranged to provide an operating signal when the said electric signal varies by more than a predetermined amount from the limit value corresponding to maximum movement of the surface away from the sensor. It may however in some cases be desirable to use the limit value corresponding to minimum spacing.

Preferably the bowing detection circuit includes means for presetting the magnitude of the variation from the limit value necessary to provide the operating signal.

In one embodiment the bowing detection circuit comprises a sample and store circuit for detecting and storing the limit value of the electric signal used in measuring bowing of the roll, during each revolution of the roll, reset means being provided to reset the sample and store circuit once in each revolution of the roll.

Preferably the reset means is arranged to respond to said electric signal returning to a value below the predetermined difference from the limit value and thereby reset the sample and store circuit. In this way the heat transfer means is operated only for a period corresponding to that when excessive bowing is detected and the sample and store circuit is reset for each revolution of the roll and starts with a new limit value which must be exceeded by more than a predetermined amount to operate the heat transfer means again.

Preferably counter means is provided for counting index pulses during the operation of the heat transfer means and terminating operation of the heat transfer means after a predetermined number of pulses if the said electric signal has not already returned to a value below the predetermined difference from the limit value. In this way, the heat transfer is terminated at a predetermined point in the cycle of operations even if the operating signal has not ceased by that time. This could possibly be caused by relative movement between the sensor and the bearings of the roller so that the electric signal derived from the sensor differs from the limit value by more than the predetermined amount although this is not due to bowing of the roll.

Conveniently the cooling means comprises means for blowing one or more air jets onto the surface of the roll. This avoids contact with the roll and enables localized cooling to be conveniently effected and controlled.

The sensor used may be non-contacting sensor or alternatively a contact making sensor may be used and arranged to engage the surface of the roll or of an extension member at one end of the roll.

In one embodiment the sensor forms part of a bridge circuit arranged to provide said electric signal. Conveniently the sensor comprises an inductive element arranged to be inductively coupled to the roll.

The output from the sensor may not necessarily be linear and in this case a linearizing circuit may be connected to the output of the bridge circuit.

The invention includes apparatus for producing a ribbon of glass from a mass of molten glass, which apparatus comprises a pair of co-operating rolls, means for causing glass to flow between the rolls, and detecting apparatus as aforesaid, arranged to detect and reduce bowing of one or both of the rolls.

The invention also includes a method of reducing bowing of a roll used in the formation of glass ribbon from a mass of molten glass, which method comprises sensing variation of the surface position of the roll by a proximity sensor arranged to provide an electric signal varying between maximum and minimum limit values in each revolution with varying position of the roll surface relative to the detector, providing an operating signal if said signal varies by more than a predetermined amount from one of said limit values and using said operating signal to operate heat transfer means in synchronism with the rotation of the roll and selectively heat or cool an appropriate part of the roll to reduce bowing.

DESCRIPTION OF THE PREFERRED EMBODIMENTS

Figure 1:
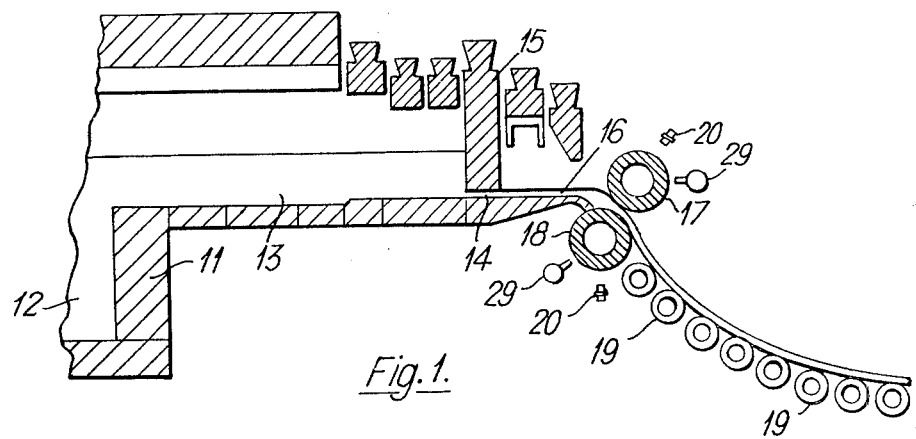
FIG. 1 is a schematic view of a known apparatus for manufacturing glass ribbon.

FIG. 1 shows known apparatus for the manufacture of rolled plate glass. A tank 11 contains a mass of molten glass 12 which is supplied along a canal 13 to an exit 14. The flow of glass through the exit 14 is controlled by a barrier in the form of a tweel 15. The thin layer of glass 16 is drawn towards a passage between two co-operating rolls 17 and 18 which are spaced apart in carefully controlled relationship so that the thickness and uniformity of glass ribbon being formed is carefully controlled. The glass ribbon leaving the rolls is supported on a plurality of rollers 19 arranged in a downwardly extending curve. The glass is still very hot when passing the rolls 17 and 18 so that these rolls cause the glass ribbon to have the required thickness and surface shape. On passing downwardly on the rollers 19 the glass hardens before reaching means (not shown) for drawing the glass through the pass between the rolls 17 and 18.

Figure 3:
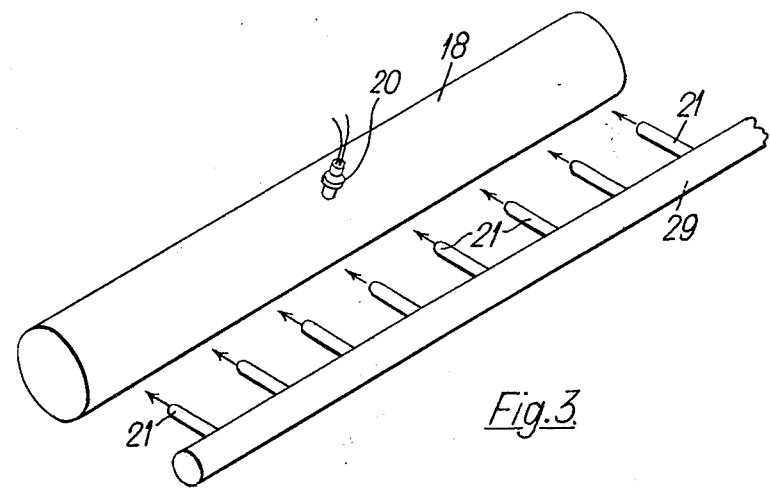
FIG. 3 is a perspective view of part of the apparatus of FIG. 2.
Figure 2:
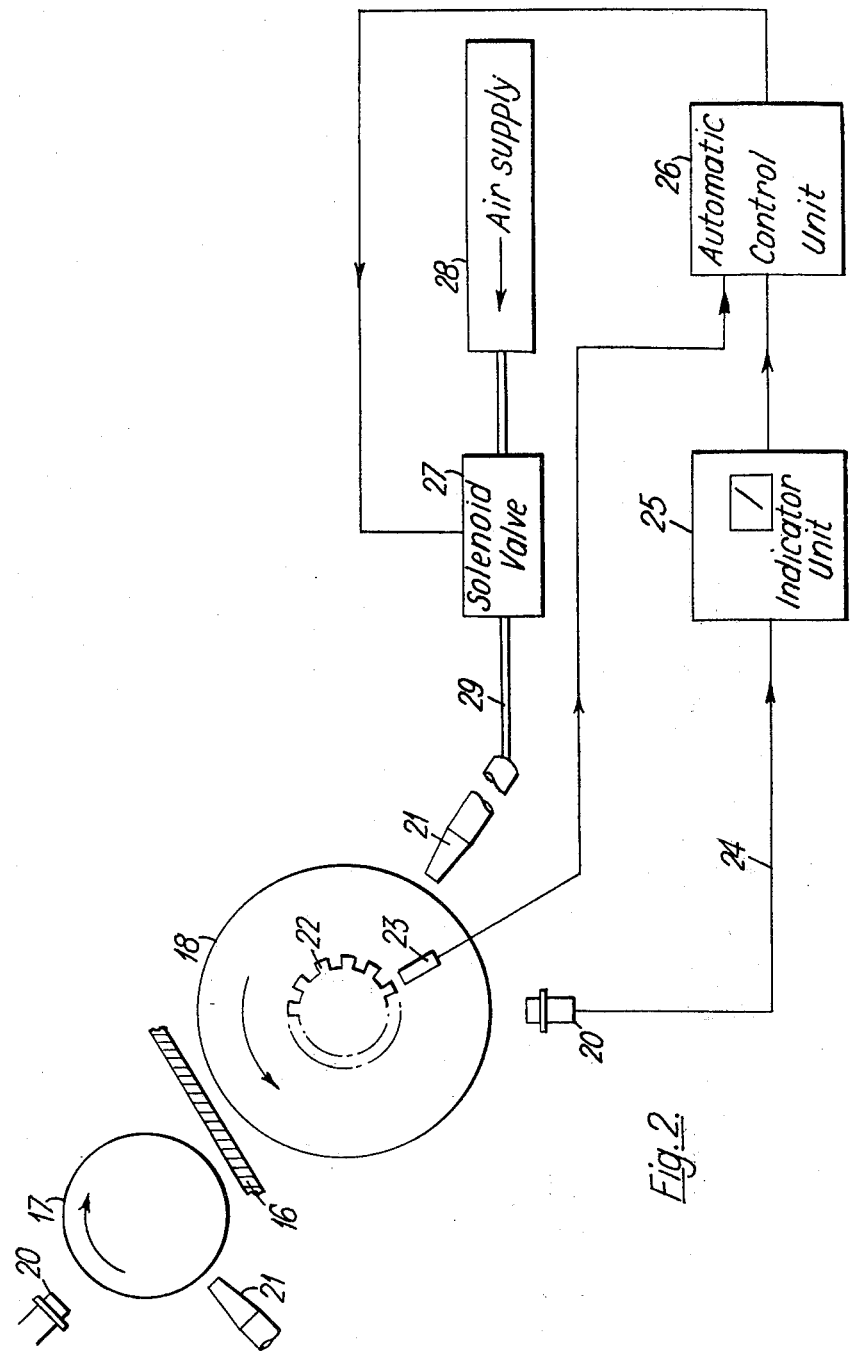
FIG. 2 shows schematically the invention applied to part of the apparatus shown in FIG. 1.

The rolls 17 and 18 become heated by the glass in contact with them and it is desirable to avoid bowing of the rolls as this would cause change in surface shape of the glass and variation in thickness of the ribbon formed. To sense and reduce any bowing of the rolls 17 and 18, the apparatus may be provided with the arrangement shown in FIG. 2. In this case, each of the rolls 17 and 18 is provided with a non-contact displacement transducer 20, e.g., of the type manufactured by Sybrook Electronics Limited, Butlers Leap, Clifton Road, Rugby, Warwickshire, England, facing the roll surface but out of contact therewith, and cooling means in the form of a plurality of airblast pipes 21 also spaced from the roll surface. In FIG. 2 the rolls 17 and 18 have been shown spaced further apart from the ribbon 16 in order to clarify the position. The operation of the transducer 20 and airblast pipes 21 for each roll is generally similar and the arrangement will now be described in more detail in relation to the lower roll 18. The transducer 20 is arranged close to and facing the surface of the roll 18 at a position midway between the ends of the roll. Similarly the airblast pipes 21 are spaced from the roll surface, facing the surface, at evenly spaced positions along the roll, as shown in FIG. 3, but angularly displaced from the transducer 20 around the periphery of the roll. At one end of the roll a toothed wheel 22 is provided and a magnetic pick-up head 23 is mounted in a fixed position close to the periphery of the toothed wheel so as to provide indexing pulses indicating angular displacement of the roller about its axis. The output of the transducer 20 is in the form of an electrical signal fed along line 24 to an indicator unit 25. The output of the indicator unit 25 as well as the output from the pick-up head 23 is fed to an automatic control unit 26. The output of the control unit 26 is fed to a solenoid valve 27 controlling the supply of compressed air from an air supply 28 leading along a pipe 29 to the airblast pipes 21. The construction of the various units shown in FIG. 2 will be described in more detail below.

Figure 4:
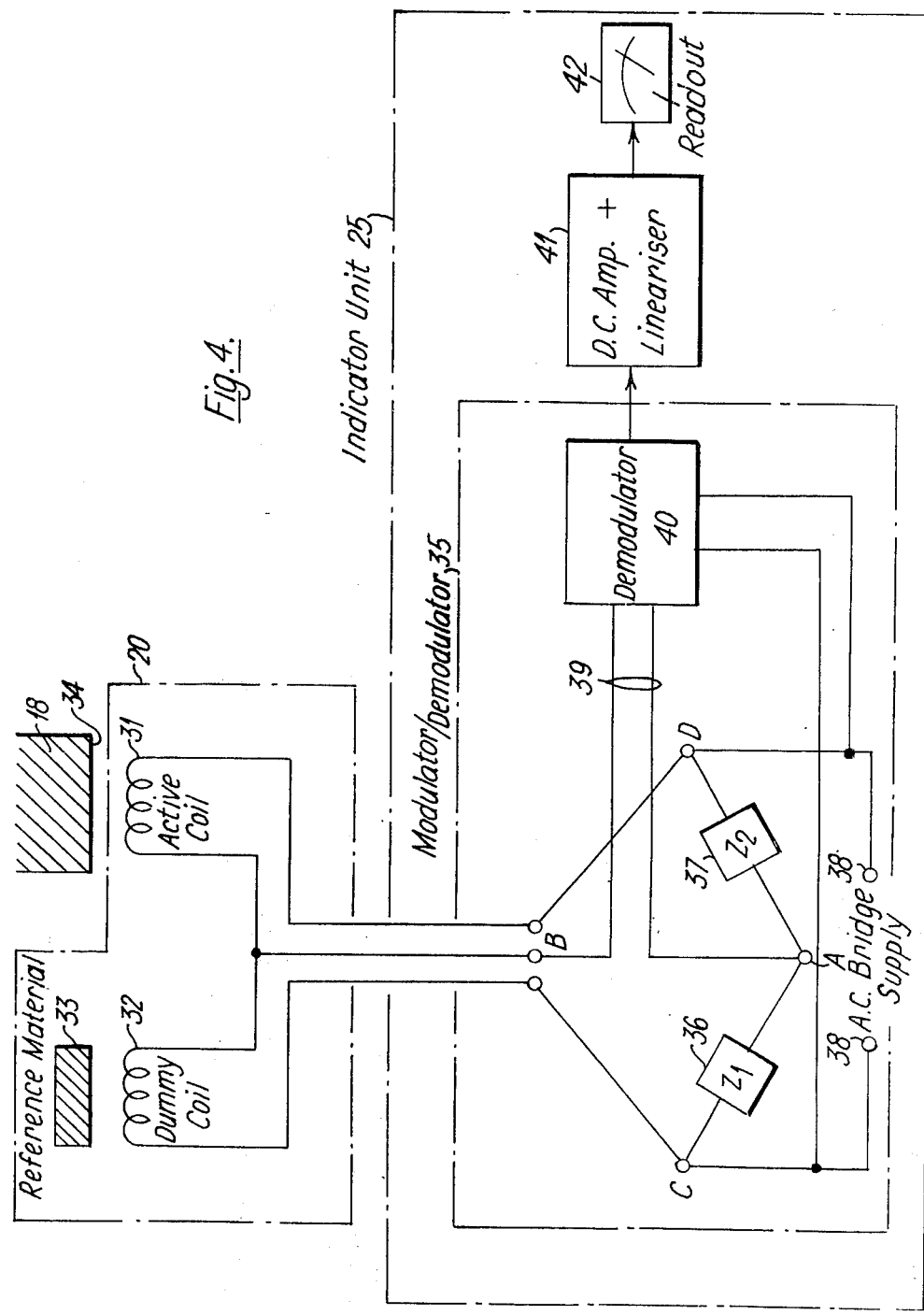
FIG. 4 shows schematically part of the apparatus shown in FIG. 2.
Figure 6:
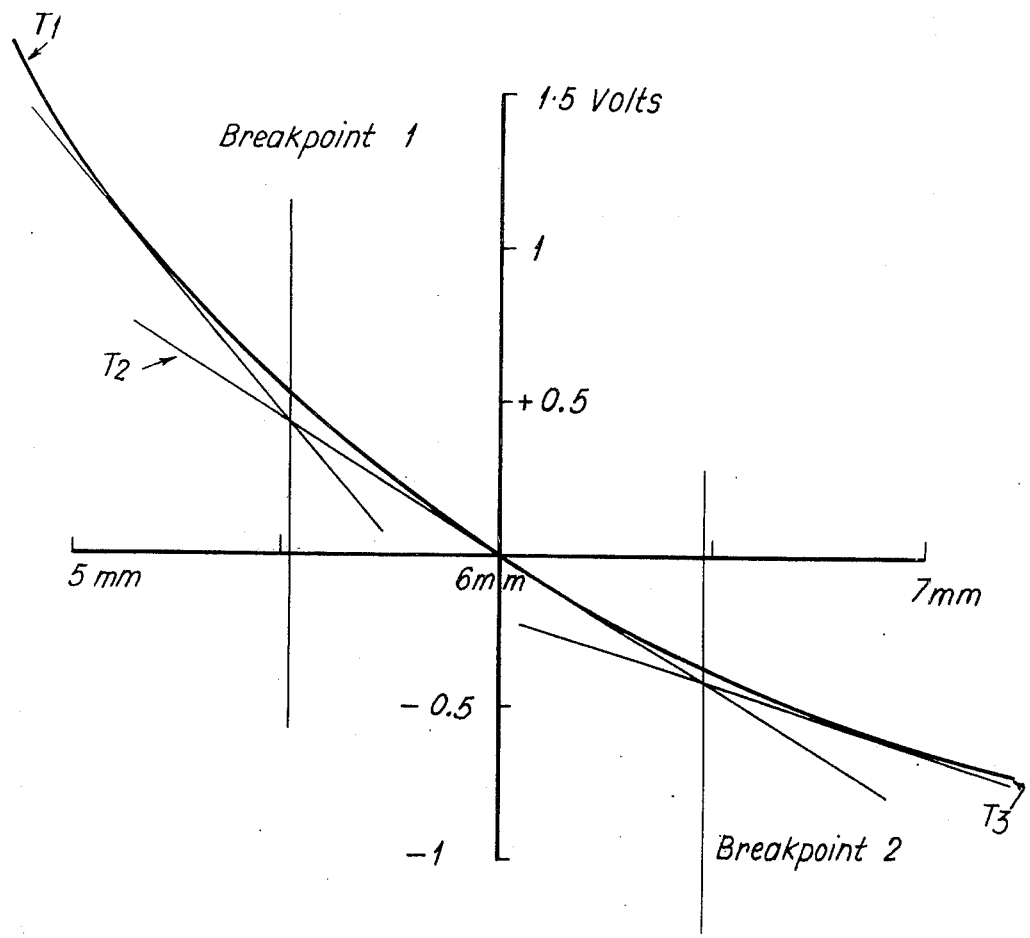
FIG. 6 shows the voltage output of part of the apparatus shown in FIG. 3.

The transducer 20 is a non-contact displacement transducer capable of withstanding a high temperature environment. The face of the transducer is positioned, in this example, 6 mm away from the roller surface and is arranged to sense an eccentricity range of plus or minus 1 mm, that is variation in position of the roller surface up to a maximum of 7 mms away from the transducer and a minimum of 5 mms. The transducer is arranged to produce a change of inductance and hence of electrical signal as the roller surface moves relative to the transducer. As shown in FIG. 4, the transducer has an active coil 31 and a dummy coil 32 forming a half bridge arrangement. The dummy coil 32 is wound at a fixed distance from a reference material 33 mounted at a fixed position within the transducer head. The active coil 31 varies in inductance as the roller surface, which provides target material 34 moves relative to the transducer. The reference material 33 is formed of the same material as the roller 18 so that the affects of temperature changes and stray magnetic fields are compensated. To detect changes in inductance in the active coil 31, the transducer 20 is connected to a standard A.C. bridge modulator/demodulator unit 35 which incorporates two impedance elements 36 and 37 arranged to complete the bridge with the active coil 31 and dummy coil 32. An A.C. bridge supply 38 is connected across the bridge. The bridge output is supplied along lines 39 to a demodulator 40 which converts the bridge modulated A.C. output to a D.C. signal. As the inductance change in the active coil 31 is non-linear with displacement of the roller surface, a linearizer circuit 41 is connected to the output of the demodulator 40. The unit 41 may be a standard D.C. amplifying and linearizing circuit. The output of the linearizing 41 is connected to a meter 42 providing a linear indication of the movement of the roller surface relative to the transducer 20. The operation of the linearizer 41 is best understood with reference to FIG. 6. The vertical axis shown in FIG. 6 indicates the voltage output for variation in the roller surface position relative to the transducer varying between 5 mms and 7 mms. As can be seen from FIG. 6, the curve approximates to the shape of the three tangents T1, T2 and T3 each having different gradients. The tangent T2 is drawn at the point where the curve passes through the origin whereas the tangents T1 and T3 represent the gradient of the curve nearer the extremes of 5 mms and 7 mms respectively. The linearizer 41 treats the input voltage as if the curve did form the three tangents T1, T2 and T3. The circuit has two gain control adjustments which allow compensation for the fact that the tangents T1 and T3 do not have the same gradient as T2. In other words, if the input voltage is positive and above the break point 1 marked in FIG. 6 then the gain is reduced. If on the other hand the input is negative and below break point 2, then the gain is increased. In this way, inputs above break point 1 or below break point 2 are adjusted so that the output of the unit 41 is substantially linear.

Figure 5:
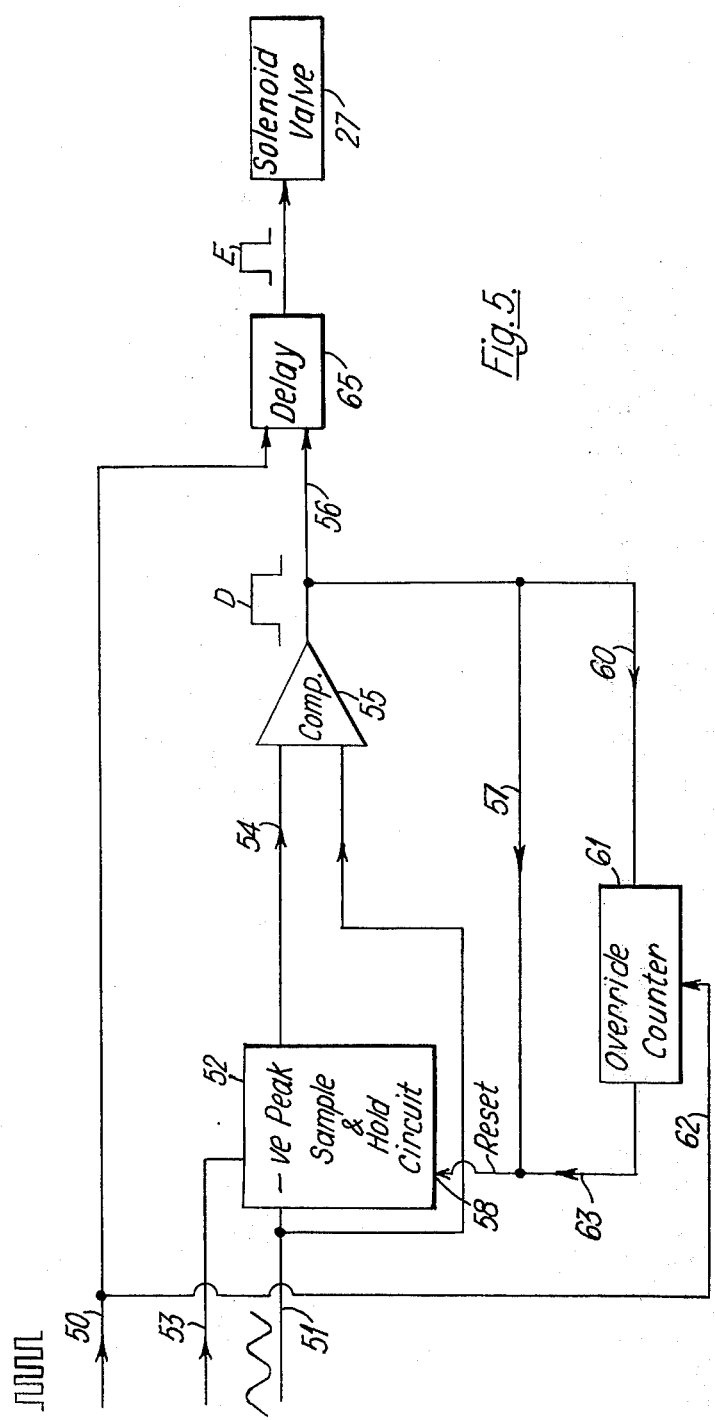
FIG. 5 shows schematically the control apparatus used in FIG. 2.
Figure 7:
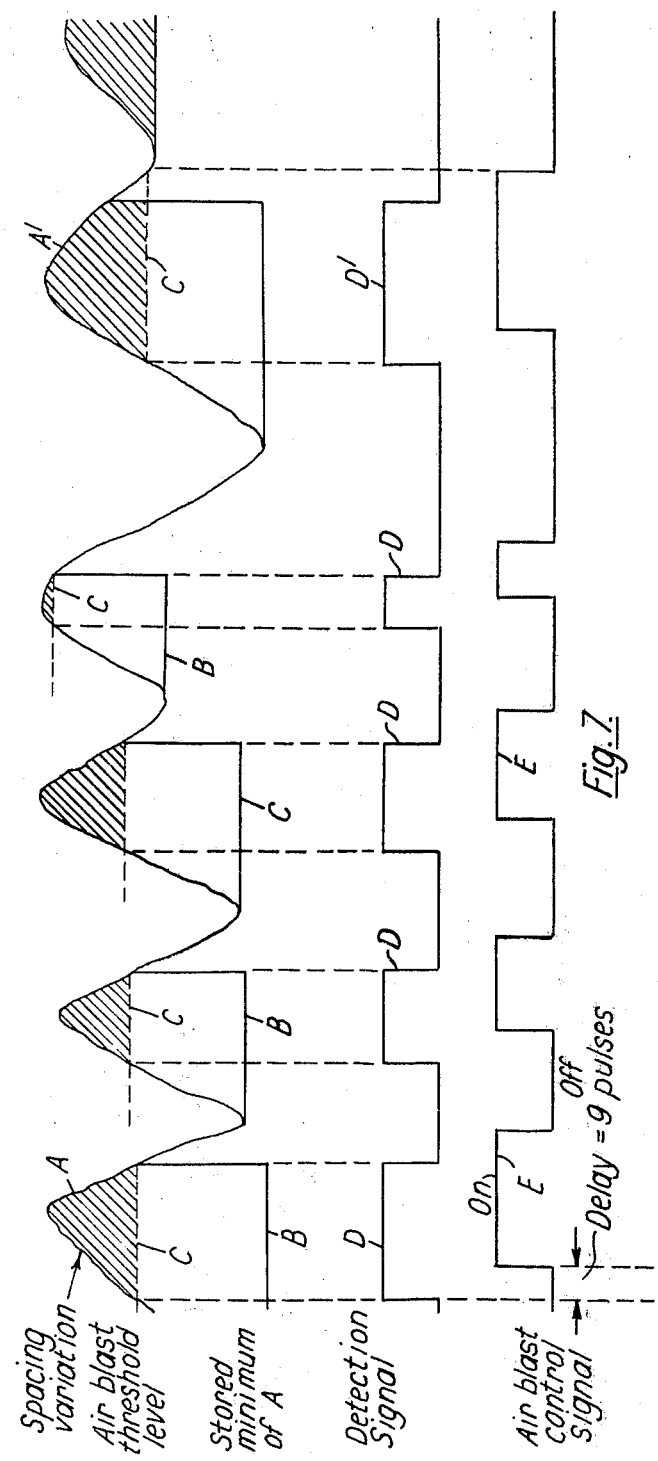
FIG. 7 shows various wave forms occurring in use of the apparatus shown in FIGS. 2 to 4.

The output of the lineariser 41 is fed to the automatic control unit 26 as well as the meter 42. The signal received by the control unit 26 is shown by the wave marked A in FIG. 7 and shows the variation in spacing between the roll surface and the sensor throughout successive revolutions of the roller 18. The control unit 26 also receives a series of index pulses from the pick-up head 23 which consists of a magnetic pick-up arranged adjacent the toothed wheel 22 which rotates with the roller 18. In this example the pick-up provides 60 index pulses per revolution of the roller. The automatic control unit 26 is shown more fully in FIG. 5. The index pulses are fed in on line 50 and the wave A is fed in on line 51. As is apparent from FIG. 7, the wave A passes through one maximum and one minimum limit value for each revolution of the roll. The maximum value corresponds to the minimum spacing between the roller surface and the transducer while the minimum of the wave A corresponds to the maximum separation between the roller surface and the transducer. The wave A is fed on line 51 into a negative peak sample and hold circuit 52. This is a standard available circuit which detects the minimum or negative peak value on the wave A and stores that value, marked B, until reset by triggering a monostable within the circuit. The circuit also has an input 53 connected to a potentiometer which can be set to provide a D.C. signal representing a spacing variation threshold level. This level represents a change of spacing between the surface and sensor beyond which the airblast is to be operated. Initially the circuit 52 adds the threshold level to the stored minimum value of the wave A to provide a level marked C above which any increase in the value of wave A will cause generation of an operating signal to operate the airblast. The output of the circuit 52 on a line 54 therefore represents the stored minimum value of A plus the set threshold level. The signal on line 54 is fed to a comparator 55 in the form of an operational amplifier also arranged to receive a signal from line 51 which has bypassed the circuit 52. The comparator 55 thereby compares the waveform A with the set level C marked in FIG. 7, and if the wave A has a value above level C, an output signal in the form of a square wave pulse D is provided on line 56 leading from the comparator. The pulse D is also shown in FIG. 7 and terminates when wave A drops below the level C. FIG. 7 shows a succession of waves A and as can be seen, once the wave A has passed through a minimum value, the circuit 52 is reset and on the next revolution of the roller 18 stores the last minimum value of the wave form A. The resetting action of the circuit 52 is caused by the negative going edge of the pulse D on line 56 which is fed back along a line 57 to an input 58 of the circuit 52. The circuit 52 adds the set threshold level from the input 53 to the new stored minimum such that the threshold level C has now been adjusted to compensate for the increased minimum stored in the circuit 52. As the roller continues to rotate, a succession of square wave pulses D are formed on line 56 the duration of each pulse D corresponding to the period for which the wave A has a value above the threshold marked by the line C. The positive going or leading edge of each operating pulse D is fed from line 56 along a line 60 to an override counting device 61. This device is arranged to receive index pulses from line 50 along a line 62 and begins counting index pulses as soon as one pulse D is formed. If the pulse D is not terminated within a preset number of index pulses, the counter 61 overrides the comparator 55 and causes a signal to be fed on line 63 to the reset input 58 of the circuit 52. This resets the circuit and terminates the pulse D on the output of the comparator 55. This situation is shown at the right hand side of FIG. 7 in which the wave A' exceeds the threshold level C for more than the preset number of index pulses and the operating pulse marked D' terminates before the wave A' has reduced to a value below the threshold C. This facility is provided in case there is relative movement between the transducer and the roller bearings. Any such relative movement could cause a displacement such that the signal A never returned below the threshold C and it would be undersirable to continue the airblast indefinitely. By the provision of the override device 61, the airblast is terminated after a predetermined angular displacement of the roller and the circuit 52 reset to store the next minimum value of the wave form A regardless of the level of that minimum.

The square wave pulses fed along line 56 pass through a delay device 65 to the solenoid valve 27. The delay device 65 also receives index pulses on line 50. The reason for the delay is to synchronize the operation of the airblast through pipes 21 with rotation of the roller 18. As shown in FIG. 2, the airblast pipes 21 are displaced angularly around the roll 18 from the transducer 20 by approximately 9 index pulse positions. The delay device 65 thereby delays the pulses on line 56 by approximately 9 index pulse positions so that the solenoid 27 is operated to cause a cooling airblast onto the same part of the roll that caused the excess value in wave form A when passing the transducer 20. The wave form leaving the delay device 65 is shown by the sequence of square wave pulses E marked in FIG. 7. As can be seen from FIG. 7, these pulses all have a 9 index pulse delay relative to the pulse sequence D representing detection of excess value A.

The air supply 28 is in this example arranged to provide compressed air at a pressure of 80 p.s.i. The solenoid valve 27 is located in the supply pipe 29 so that the airblast is switched on or off by operation of the valve 27.

By use of the above example, any bowing of the roller is detected by a transducer located out of contact with the roller and the airblast is selectively applied to localized regions of the roller for which the value of the wave form A exceeds the threshold level C. This cooling is effective to reduce the bowing and the control circuit used ensures that the airblast is applied only to those selected regions. Furthermore, the threshold level is reset for each revolution of the roll 18 and is a threshold relative to the maximum spacing detected for each revolution. In this way, the threshold is independent of any bodily movement of the roller or the transducer and the correcting action dependent only on eccentricity caused by deformation of the roller shape.

The invention is not limited to the details of the foregoing example. For instance, the arrangement shown in FIG. 8 may be used in place of the arrangement of FIG. 3. In this case the non contact making transducer of FIG. 3 is replaced by a contacting transducer 20a arranged to engage the surface of a cylindrical collar 70 fitted to a shaft 71 which forms an extension of the axle of the roller 18. The roller 18 is mounted in bearing blocks 72 and 73 and any bowing of the roller 18 will cause the extension shaft 71 to wobble and this will be detected by the transducer 20a. The collar 70 against which the transducer bears is part of the drive for the roll 18 but with its peripheral surface machined to make it truly cylindrical. The transducer 20a is of a standard commercially available form including a differential transformer having a movable element driven by a plunger which is in contact with the collar 70. The output from the transformer is used as previously described with reference to FIGS. 2, 4 and 5 except that the delay unit 65 is arranged to introduce such delay that the airblast operates on the part of the roll 180° displaced from the part of the collar giving rise to the operating signal. This is because the collar surface will tend to move in the opposite direction to the roll surface as the roll rotates, as the roll and collar are on opposite sides of the bearing block 73. As the shaft 71 and collar 70 are cold, the transducer 20a is not harmed by contact with the collar. Furthermore the transducer may be located at the same angular position around the axis of the roller as the cooling pipes 21. This arrangement shown in FIG. 8. It is also possible to modify the arrangement shown in FIG. 8 so that the transducer 20a is displaced around the collar 70 to a position 180° around the axis from the position of the cooling pipes 21. In this way there is no need to delay operation of the air blast once the transducer 20a gives a signal indicating that cooling is necessary.

Figure 8:
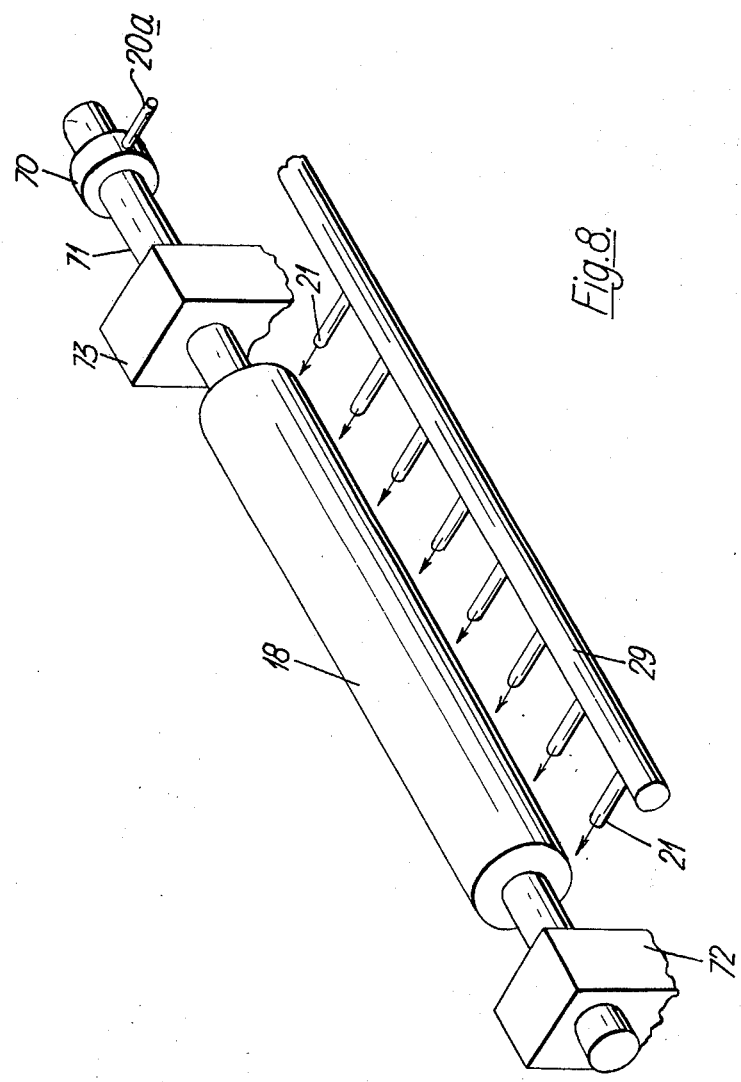
FIG. 8 shows an alternative arrangement to that of FIG. 3.

The contacting transducers 20a in FIG. 8 has the advantage that it can be used with both ferrous and non-ferrous rollers, whereas the non-contacting transducer 20 in FIG. 3 can be used only with ferrous rollers, such as those made from cast iron. The need to develop a non-contact system suitable for detecting both ferrous and non-ferrous roller deformation led to the system shown schematically in FIG. 9.

Components of FIG. 9 identical to those components shown and described with reference to FIG. 2 have been designated with the same reference numerals. The function of those identical components of FIG. 9 is the same as those of FIG. 2 and will not therefore be further described.

Figure 9:
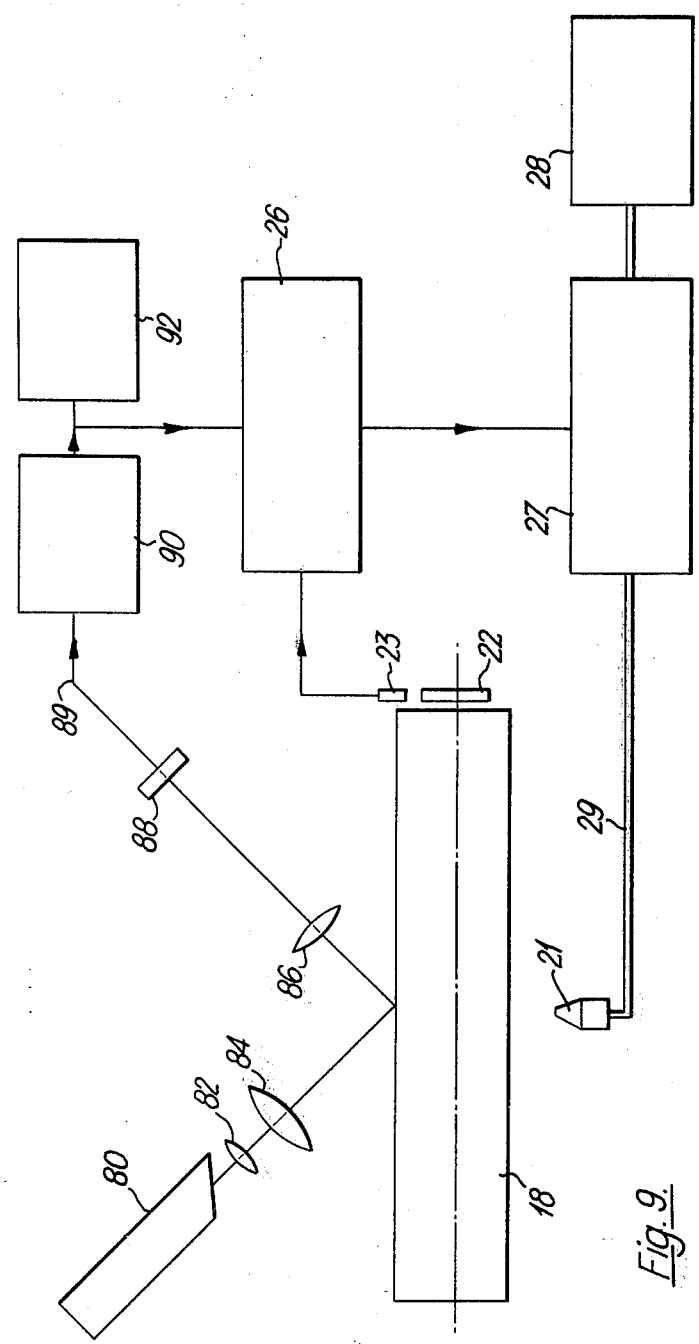
FIG. 9 is a schematic representation of a further embodiment of the invention.

The system of FIG. 9 uses a low-power, HeNe laser 80 whose layer beam is focussed by way of lenses 82 and 84 onto the roller surface, the reflected laser beam is then refocussed by way of a lens 86 onto a photodetector, such as a photocell 88. If the roller surface has good reflectively properties the lens 86 can be dispensed with and the reflected laser beam focussed directly onto the photocell 88. The photocell 88 is sensitive to changes of position in the reflected laser beam so that the output from the photocell 88 is linearly dependent upon and indicative of roller deformation.

The distance between the laser 80 and the surface of the roller 18 can be of the order of 500 mm whilst the distance from the roller surface to the photocell 88 varies in dependence upon the optical lever required to achieve the necessary sensitivity. For example, if the photocell 88 has a position sensitivity of $0.8\mu A/mW/0.025$ mm and the laser 80 projects a laser beam whose power is 0.5 mW, the optical level is adjusted for minimum movements of 0.025 mm of the reflected beam in the plane of the photocell 88.

The output signals from the photocell 88 are fed along line 89 to the input of a sum and difference preamplifier 90 which compensates for changes in the reflectivity of the roller surface and amplifies the signals which are fed to an analogue or digital display 92 and the automatic control unit 26.

Although the above examples have described selective cooling of the roller when excess bowing is detected, it may be possible in some cases to use selective heating to correct the bowing. It may however in this case be necessary to apply heat to the part of the roll 180° around the roll from the part of the roll which gives rise to the operating signal.

In FIG. 7, the threshold determining excessive bowing is calculated from the minima in the wave form A. It is however possible to use a threshold at a set amount below the maxima of the wave form A.

We claim:

1. Apparatus for detecting and reducing bowing of a rotating roll which is used in contact with hot material, which apparatus comprises a proximity sensor mounted in a fixed position adjacent the surface of a roll or of a member attached thereto, and arranged to generate an electric signal which varies between maximum and minimum limit values during each revolution of the roll in dependence on movement of the surface towards and away from the sensor as the roll rotates, heat transfer means arranged for selectively transferring heat to or from parts of the roll and control means responsive to said electric signal and arranged to control operation of the heat transfer means, said control means comprising a bowing detection circuit arranged to receive said electric signal and provide an operating signal for that period, if any, during any one revolution of the roll, that the said electric signal varies by more than a predetermined amount from one of the said limit values, and actuating means arranged to respond to the operating signal and operate the heat transfer means in predetermined synchronism with the occurrence of the operating signal so that heat is selectively transferred to or from a required part of the roll to reduce bowing of the roll.

2. Apparatus according to claim 1 in which the heat transfer means comprises cooling means and the predetermined synchronism between the occurrence of the operating signal and the operation of the cooling means is such that cooling is applied to that part of the roll which is bowed outwardly from the axis of the roll.

3. Apparatus according to claim 1 in which the heat transfer means comprises heating means and the predetermined synchronism between the occurrence of the operating signal and the operation of the heating means is such that heat is applied to that part of the roll 180° around the roll from the part which is bowed outwardly from the axis of the roll.

4. Apparatus according to claim 1 in which the heat transfer means is located at an angular displacement around the roll from the said sensor and the control means includes a roll position detector arranged to provide a signal indicating change in the angular position of the roll, said actuating means being responsive to the output of the position detector so as to operate the heat transfer means when the roll has rotated through said angular displacement.

5. Apparatus according to claim 4 wherein the roll position detector includes a pulse generator arranged to produce index pulses as the roll rotates.

6. Apparatus according to claim 5 wherein counter means is provided for counting index pulses during the operation of the heat transfer means and terminating operation of the heat transfer means after a predetermined number of pulses if the said electric signal has not already returned to a value below the predetermined difference from the limit value.

7. Apparatus according to claim 1 wherein the bowing detection circuit is arranged to provide an operating signal when the said electric signal varies by more than a predetermined amount from the limit value corresponding to maximum movement of the surface away from the sensor.

8. Apparatus according to claim 1 wherein the bowing detection circuit includes means for presetting the magnitude of the variation from the limit value necessary to provide the operating signal.

9. Apparatus according to claim 1 wherein the bowing detection circuit comprises a sample and store circuit for detecting and storing the limit value of the electric signal used in measuring bowing of the roll, during each revolution of the roll, reset means being provided to reset the sample and store circuit once in each revolution of the roll.

10. Apparatus according to claim 9, wherein the reset means is arranged to respond to said electric signal returning to a value below the predetermined difference from the limit value and thereby reset the sample and store circuit.

11. Apparatus according to claim 1 wherein the heat transfer means comprises cooling means for blowing one or more air jets onto the surface of the roll.

12. Apparatus according to claim 1 wherein the sensor is a non contacting sensor.

13. Apparatus according to claim 1 wherein a contact making sensor is used and arranged to engage the surface of the roll or of an extension member at one end of the roll.

14. Apparatus according to claim 12 wherein the sensor comprises a laser arranged to direct a laser beam towards the surface of the roll together with a photodetector arranged to detect reflected light from the surface.

15. Apparatus according to claim 12 wherein the sensor comprises an inductive element arranged to be inductively coupled to the roll.

16. Apparatus for producing a ribbon of glass from a mass of molten glass, which apparatus comprises a pair of co-operating rolls, means for causing glass to flow between the rolls, and detecting apparatus as claimed in claim 1 arranged to detect and reduce bowing of one or both of the rolls.

17. A method of reducing bowing of a roll used in the formation of glass ribbon from a mass of molten glass, which method comprises sensing variation of the surface position of the roll by a proximity sensor arranged to provide an electric signal varying between maximum and minimum limit values in each revolution with varying position of the roll surface relative to the detector, providing an operating signal if said signal varies by more than a predetermined amount from one of said limit values and using said operating signal to operate heat transfer means in synchronism with the rotation of the roll and selectively heat or cool an appropriate part of the roll to reduce bowing.

* * * * *